US012789035B2

(12) United States Patent
Qi

(10) Patent No.: US 12,789,035 B2
(45) Date of Patent: Nov. 10, 2026

(54) CONNECTOR THAT CAN BE USED TO CONNECT FITNESS EQUIPMENT

(71) Applicants: Xinbu Chen, Yongkang (CN); Lingzhi Qi, Yongkang (CN)

(72) Inventor: Lingzhi Qi, Yongkang (CN)

(73) Assignees: Xinbu Chen, Yongkang (CN); Lingzhi Qi, Yongkang (CN)

( * ) Notice: Subject to any disclaimer, the term of this patent is extended or adjusted under 35 U.S.C. 154(b) by 277 days.

(21) Appl. No.: 18/433,956

(22) Filed: Feb. 6, 2024

(65) Prior Publication Data

US 2025/0152993 A1 May 15, 2025

(30) Foreign Application Priority Data

| | | |
|---|---|---|
| Nov. 13, 2023 | (CN) | 202323060429.3 |
| Jan. 3, 2024 | (CN) | 202420015467.2 |
| Jan. 18, 2024 | (CN) | 202420130644.1 |
| Jan. 18, 2024 | (CN) | 202420131517.3 |

(51) Int. Cl.
*F16B 7/04* (2006.01)
*A63B 21/072* (2006.01)

(52) U.S. Cl.
CPC .......... *A63B 21/0722* (2015.10); *F16B 7/042* (2013.01); *F16B 7/044* (2013.01)

(58) Field of Classification Search
CPC .. F16B 7/044; F16B 7/048; F16B 7/20; F16B 7/0486; Y10T 403/3933; Y10T 403/3953; Y10T 403/3961; Y10T 403/4611
USPC ................................ 403/192, 195, 196, 234
See application file for complete search history.

(56) References Cited

U.S. PATENT DOCUMENTS

| | | | | |
|---|---|---|---|---|
| 3,716,650 | A * | 2/1973 | de Mecquenem | H02G 7/12 24/135 R |
| 4,911,573 | A * | 3/1990 | Pietro | F16B 7/20 285/361 |
| 8,668,402 | B2 * | 3/2014 | Mori | F16L 41/12 403/175 |
| 9,303,668 | B2 * | 4/2016 | Yoshino | F16B 7/0486 |
| 9,731,159 | B2 * | 8/2017 | Reynolds | A63B 21/4035 |
| 11,752,385 | B2 * | 9/2023 | Abbott | A63B 21/0722 482/106 |
| 2012/0252641 | A1 * | 10/2012 | Odneal | A63B 21/072 482/108 |

(Continued)

FOREIGN PATENT DOCUMENTS

| | | | | |
|---|---|---|---|---|
| KR | 200418023 | Y1 * | 8/2006 | A63B 21/0004 |
| KR | 200437442 | Y1 * | 11/2007 | A61H 39/04 |

*Primary Examiner* — Amber R Anderson
*Assistant Examiner* — Zachary A Hall
(74) *Attorney, Agent, or Firm* — Birchwood IP

(57) ABSTRACT

Provided is a connector that can be used to connect fitness equipment. The connector includes a first connection member and a second connection member that are hinged to each other, a clamp cavity configured to connect the fitness equipment is formed by enclosing the first connection member and the second connection member, a buckling structure configured to lock or unlock the first connection member and the second connection member is provided between the first connection member and the second connection member. Compared to a structure of locking a connector by screwing a nut, the advantage of the present disclosure is that locking or opening is simple, convenient, and quick by flipping the buckle to fasten.

8 Claims, 6 Drawing Sheets

(56) References Cited

U.S. PATENT DOCUMENTS

| | | | | |
|---|---|---|---|---|
| 2015/0105224 | A1* | 4/2015 | Odneal .................. | B22D 17/00<br>164/47 |
| 2023/0330471 | A1* | 10/2023 | Theofilos ........... | A63B 21/0726 |

* cited by examiner

CONNECTOR THAT CAN BE USED TO CONNECT FITNESS EQUIPMENT

CROSS-REFERENCE TO RELATED APPLICATIONS

This application claims priority to Chinese Patent Application No. 202420130644.1, filed on Jan. 18, 2024, Chinese Patent Application No. 202420131517.3, filed on Jan. 18, 2024, Chinese Patent Application No. 202420015467.2, filed on Jan. 3, 2024, Chinese Patent Application No. 202323060429.3, filed on Nov. 13, 2023, which is hereby incorporated by reference in its entirety.

TECHNICAL FIELD

The present disclosure relates to field of fitness equipment, and in particular, to a connector that can be used to connect fitness equipment.

BACKGROUND

Nowadays, with the improvement of living standards, exercise has become an important way for people to maintain physical and mental health, and usually people mainly use fitness equipment of dumbbells, kettlebells, barbells. However, most dumbbells, kettlebells, and barbells on the market cannot be converted to each other, and users need to purchase dumbbells, kettlebells, and barbells separately to achieve a comprehensive fitness effect, which makes a cost of fitness increase greatly.

Publication No. US20220355153A1 discloses a connection member through which dumbbells and handles are connected to form a kettlebell structure, and two dumbbells and a long rod are connected through two connection members to form a barbell structure. This connection generally consists of a first connection member and a second connection member that are articulated with each other, and the first and the second connection members are fixed by nuts, which makes the connection to be time-consuming and labor-intensive.

In order to increase the difficulty of training, people will tie two ends of the elastic cord to the barbell, step on the elastic cord with both feet, and pull up the barbell as fast as possible, so as to increase the strength through this training method. However, the elastic cord is fixed on the barbell by tying, under the action of high-intensity tension, the connection between the elastic cord and the barbell will be loosened, and this fix method is not only time-consuming and laborious, but also has a potential safety hazard.

SUMMARY

A main objective of the present disclosure is to solve the above problems of fitness equipment connectors, and provide a connector can be quickly locked, be quickly connected to fitness equipment, and be more convenient and fixed for a connection between the connector and an elastic cord.

To achieve the above objective, the present disclosure adopts the following technical solutions.

A connector that can be used to connect fitness equipment, including a first connection member and a second connection member that are hinged with each other, a clamp cavity configured to connect the fitness equipment is formed by enclosing the first connection member and the second connection member, a buckling structure configured to lock or unlock the first connection member and the second connection member is provided between the first connection member and the second connection member.

In the connector that can be used to connect fitness equipment, an outer wall of the first connection member is provided with a buckle ring, the first connection member is provided with a locking through-hole which is interconnected with the clamp cavity, the fitness equipment mounted in the clamp cavity is provided with a locking threaded hole corresponding to the locking through-hole; an end of the buckle ring is provided with a threaded rod, through which the buckle ring passes through the locking through-hole and is screwed into the locking threaded holes of the fitness equipment.

In the connector that can be used to connect fitness equipment, the clamp cavity includes a first clamp hole and a second clamp hole that are perpendicular to each other, the first clamp hole is a through-hole running forward and backward along its axis.

In the connector that can be used to connect fitness equipment, the locking through-hole is connected to the second clamp hole.

In the connector that can be used to connect fitness equipment, the buckling structure includes a buckle that is rotationally provided on the second connection member, a bayonet provided on the second connection member, a buckle plate that is provided at an outer end of the buckle, when the buckle is rotated and passes through the first connection member, the buckle is pressed, and the buckle plate is elastically deformed and is inserted into the bayonet to form a lock.

In the connector that can be used to connect fitness equipment, the second connection member is provided with a rotation portion that is integrally molded with the second connection member, the buckle is rotatably provided on the rotation portion.

In the connector that can be used to connect fitness equipment, an outer end of the buckle is outwardly curved to form a pressing portion, the buckle plate is fixed on an inner surface of the pressing portion. A design of the pressing portion renders it easier and labor-saving for a user to rotate the buckle.

In the connector that can be used to connect fitness equipment, the buckle, pressing portion, and buckle plate are integrally processed and molded.

In the connector that can be used to connect fitness equipment, the first connection member is further fixedly provided with a contact piece, so that when the first connection member is rotated to be locked with the second connection member, the contact piece is configured to cover a gap between the first connection member and the second connection member. The contact piece renders an overall structure of an assembled connector more stable.

In the connector that can be used to connect fitness equipment, the first connection member is provided with a first groove, the second connection member is provided with a second groove, when the first connection member is rotated to be locked with the second connection member, the first groove and the second groove are combined up and down to form the first clamp hole; the first connection member is provided with a third groove, the second connection member is provided with a fourth groove, when the first connection member is rotated to be snapped and locked with the second connection member, the third groove and fourth groove are combined up and down to form the second clamp hole.

In the connector that can be used to connect fitness equipment, the first groove is embedded with a first anti-slip pad, the second groove is embedded with a second anti-slip pad, both the first anti-slip pad and the second anti-slip pad are semi-circular in cross-section, so that when the first connection member is rotated to be snapped and locked with the second connection member, the first anti-slip pad and the second anti-slip pad are combined to form an anti-slip hole. When the dumbbell is mounted into the first clamp hole, the dumbbell can be restricted by the non-slip hole so as to be less prone to slide.

In the connector that can be used to connect fitness equipment, the fitness equipment mounted in the second clamp hole is fixed with a fixing rod, the fitness equipment is inserted into the first clamp hole through the fixing rod, and the locking threaded hole is provided on the fixing rod.

In some embodiments, the fitness equipment mounted in the second clamp hole can be a handle or a long rod, the handle is fixedly provided with a fixing rod, the handle is installed into the second clamp hole through the fixing rod, the dumbbell is installed into the first clamp hole to form a kettlebell structure; two ends of the long rod are respectively provided with a fixing rod; the two ends of the long rod are respectively installed into the second clamp hole through the fixing rod, and two dumbbells are respectively installed into the first clamp holes of the two connection members to form a barbell structure.

In the connector that can be used to connect fitness equipment, an inner wall of the second clamp hole is fixedly provided with several bumps, an outer wall of the fixing rod is provided with clamp slots corresponding to the bumps one by one.

Compared with the prior art, the present disclosure has the following beneficial effects:

1. compared to a structure of locking a connection member by screwing nuts, it is simple, convenient and quick to lock or open by flipping a buckle;
2. by fixing a spring lock on two ends of an elastic cord respectively, and connecting two spring locks to buckle rings of two connection members, an installation of the elastic cord and the connection members is thus convenient and fast, and the connection is more secure;
3. when installing the buckle ring, a threaded rod on the buckle ring can pass through a locking through-hole and a locking threaded hole on the fixing rod of the fitness equipment, so as to improve a stability of a connection between the connecter and the fitness equipment, rendering the connection more secure.

Numeral reference: 1. First connection member; 2. Second connection member; 3. Locking through-hole; 4. First clamp hole; 5. Second clamp hole; 6. Buckle; 7. Bayonet; 8. Buckle plate; 9. Rotation portion; 10. Pressing portion; 11. Buckle ring; 12. Bump; 13. Concave hole; 15. Contact piece; 16. First groove; 17. Second groove; 18. Third groove; 19. Fourth groove; 20. Fixing rod; 21. Handle; 22. Long rod; 23. Elastic cord.

DESCRIPTION OF EMBODIMENTS

The following will provide a clear and complete description of the technical solution in the embodiment of the present disclosure in combination with the drawings. Obviously, the described embodiments are only a part of the embodiments of the present disclosure, not all of them.

Figure 1:
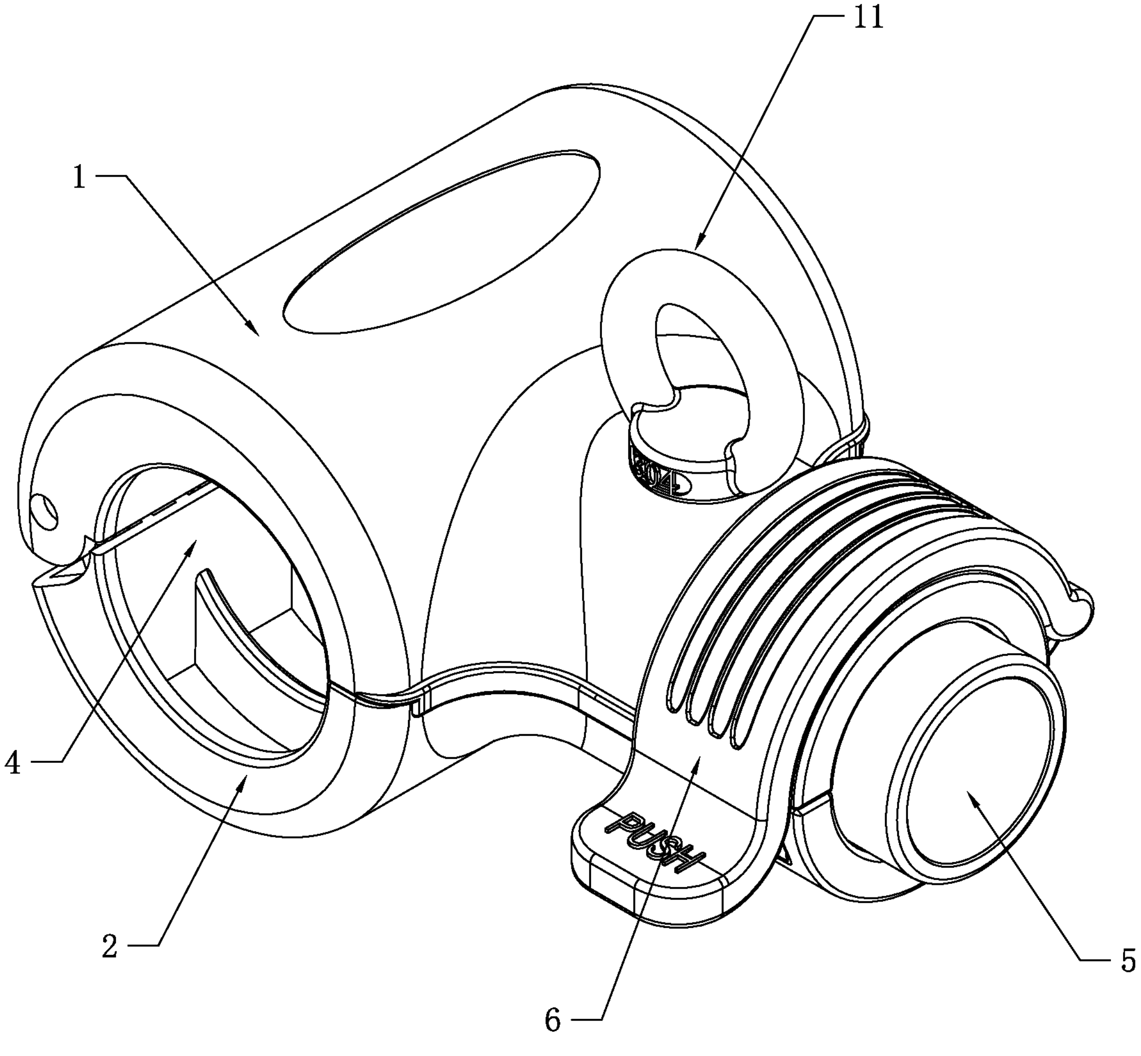
FIG. 1 is a schematic diagram of a connector of the present disclosure after being locked.

As shown in FIG. 1, a connector that can be used to connect fitness equipment as described in the present disclosure includes a first connection member 1 and a second connection member 2 that are hinged with each other, a clamp cavity configured to connect the fitness equipment is formed by enclosing the first connection member 1 and the second connection member 2; the clamp cavity includes a first clamp hole 4 and a second clamp hole 5 that are perpendicular to each other; the first clamp hole 4 is a through-hole passing forward and backward along its axis.

Figure 2:
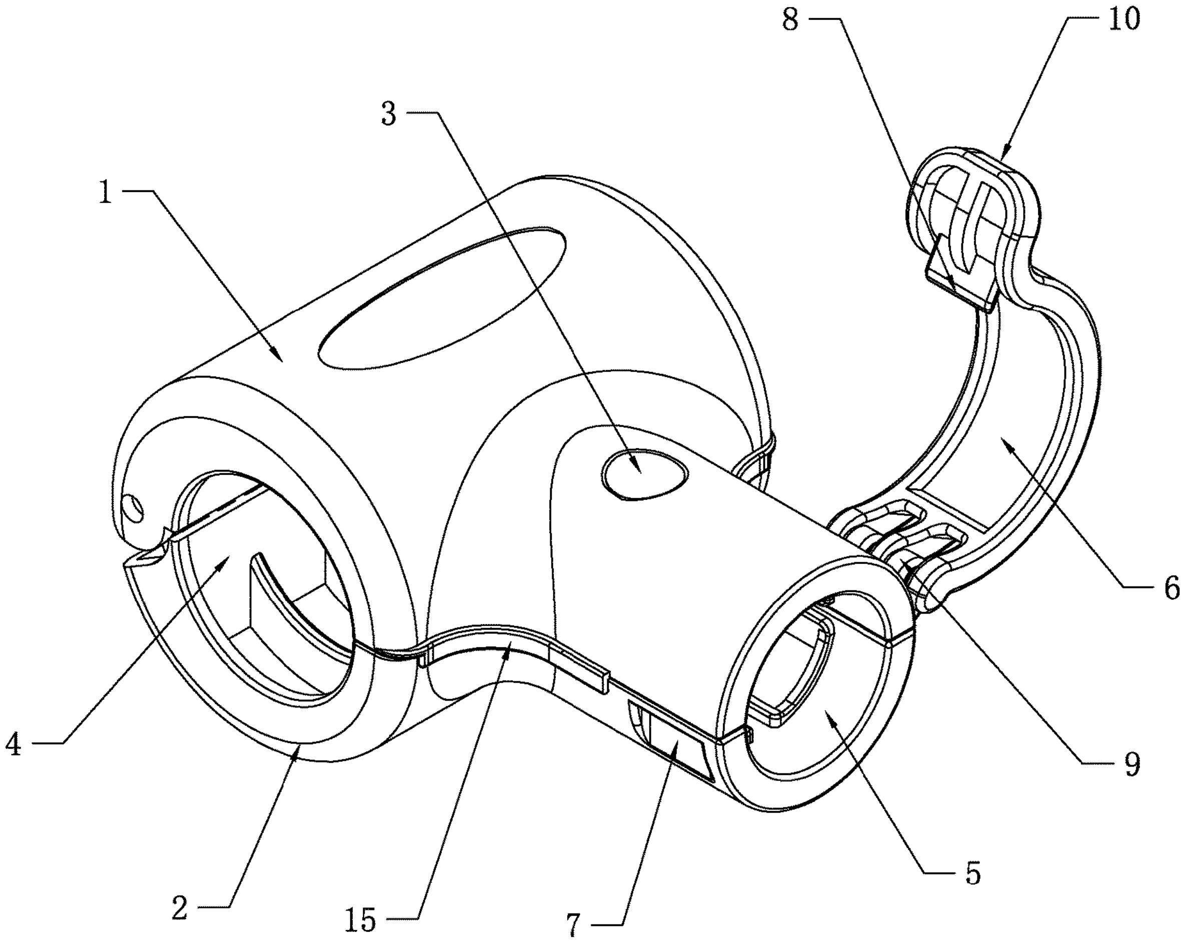
FIG. 2 is a schematic diagram of a buckle of the present disclosure being opened.
Figure 3:
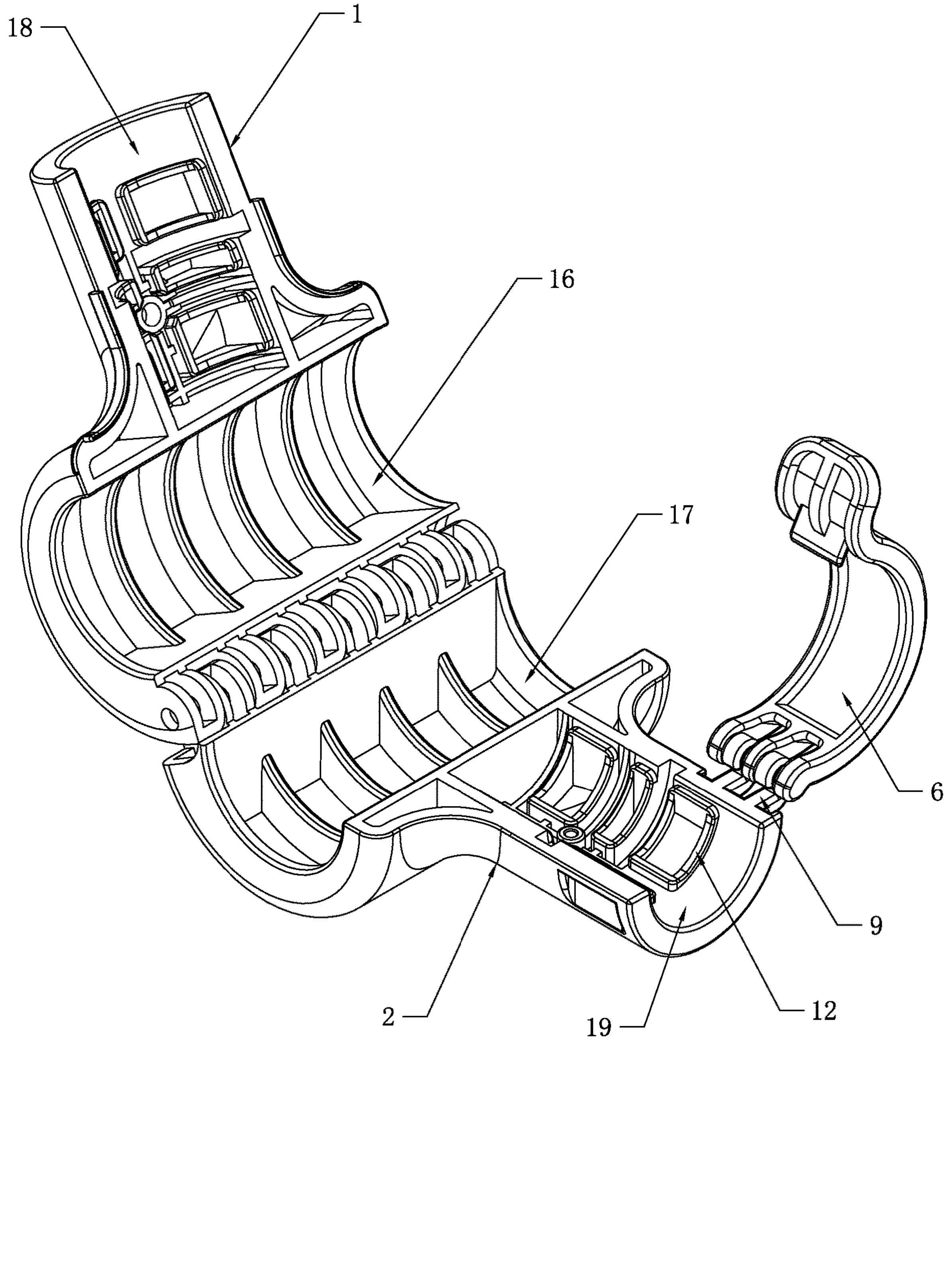
FIG. 3 is a schematic diagram of the connector of the present disclosure after being opened.

As shown in FIGS. 2 and 3, a buckling structure configured to lock or unlock the first connection member 1 and the second connection member 2 is provided between the first connection member 1 and the second connection member 2; the buckling structure includes a buckle 6 rotationally provided on the second connection member 2, a bayonet 7 provided on the second connection member 2, and a buckle plate 8 fixedly provided at an outer end of the buckle 6; after the buckle 6 rotating round the first connection member 1, the buckle 6 is pressed to cause the buckle plate 8 to be elastically deformed and inserted into the bayonet 7 to form a lock.

The second connection member 2 is fixedly provided with a rotation portion 9 that is integrally molded with the second connection member 2, the buckle 6 is rotationally provided on the rotation portion 9. An outer end of the buckle 6 is outwardly curved to form a pressing portion 10, and the buckle plate 8 is fixedly provided on an inner surface of the pressing portion 10. The buckle 6, pressing portion 10, and buckle plate 8 are integrally processed and molded.

Figure 4:
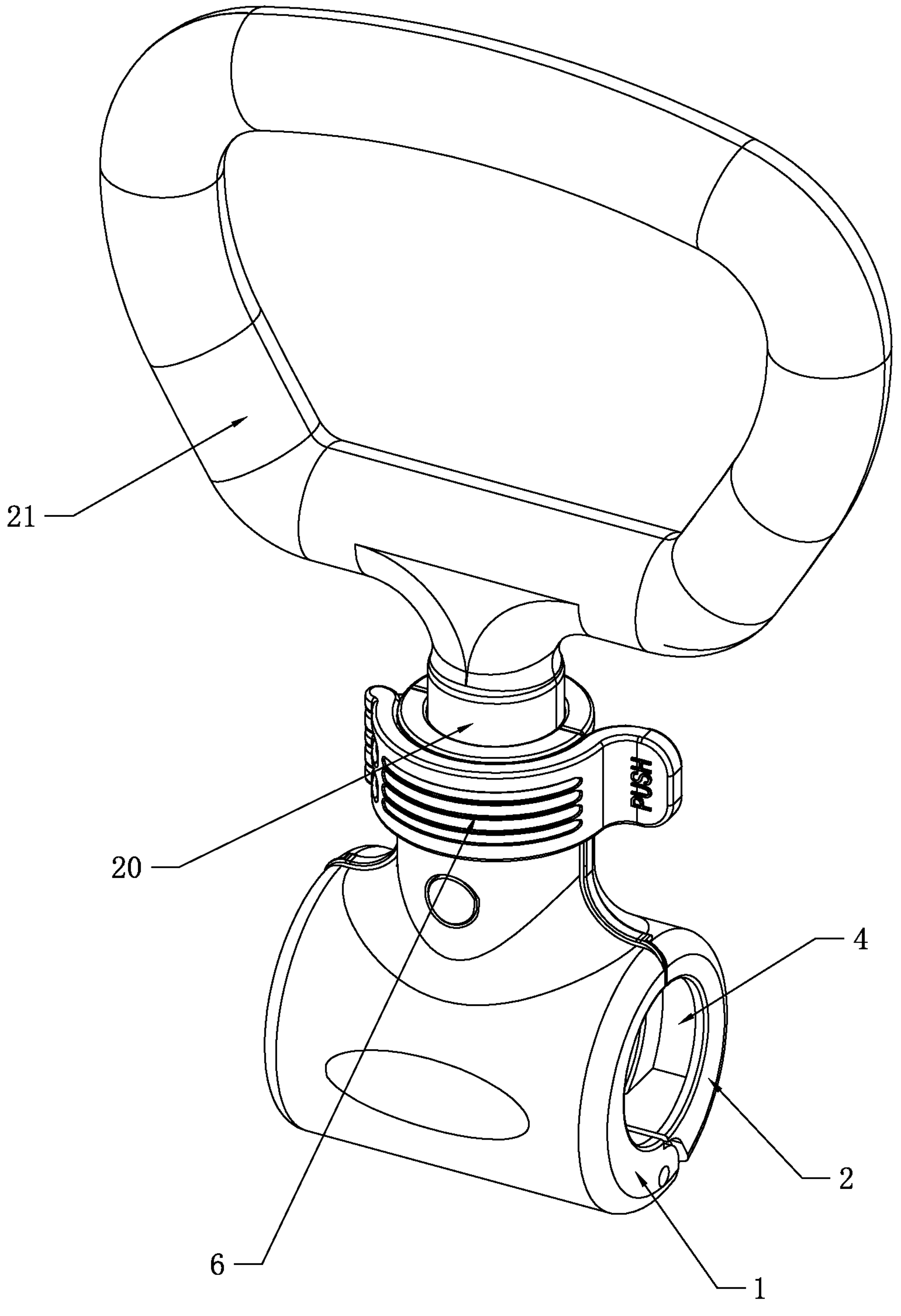
FIG. 4 is a schematic diagram of an installation of the connector with a handle of the present disclosure.

As shown in FIG. 4, a buckle ring 11 is provided on an outer wall of the first connection member 1, the first connection member 1 is provided with a locking through-hole 3 interconnected with the clamp cavity, the fitness equipment mounted in the clamp cavity is provided with a locking threaded hole corresponding to the locking through-hole; an end of the buckle ring 11 is provided with a threaded rod, the buckle ring 11 is screwed and connected with the locking threaded hole in the fitness equipment through passing through the locking through-hole 3 by the threaded rod.

The first connection member 1 is further provided with a contact piece 15 configured to cover a gap between the first connection member 1 and the second connection member 2 when the first connection member 1 is rotated to snap and lock with the second connection member 2. The contact piece 15 renders an overall structure of a combined connector more stable.

The first connection member 1 is provided with a first groove 16, the second connection member 2 is provided with a second groove 17, when the first connection member 1 is rotated to snap and lock with the second connection member 2, the first groove 16 and the second groove 17 are combined up and down to form the first clamp hole 4; the first connection member 1 is provided with a third groove 18, the second connection member 2 is provided with a fourth groove 19, when the first connection member 1 is rotated to be locked with the second connection member 2, the third groove 18 and the fourth groove 19 are combined up and down to form the second clamp hole 5.

The first groove 16 is embedded with a first anti-slip pad, the second groove 17 is embedded with a second anti-slip pad, the first anti-slip pad and the second anti-slip pad are both semi-circular in cross-section, and when the first connection member 1 is rotated to be snapped and locked with the second connection member 2, the first anti-slip pad and the second anti-slip pad are combined to form an anti-slip hole. When the dumbbell is mounted in the first clamp hole 4, the dumbbell can be subjected by the anti-slip hole so that it is not prone to slide.

A fixing rod 20 is fixedly provided on the fitness equipment installed in the second clamp hole 5, the fitness equipment is inserted into the first clamp hole 4 through the fixing rod 20. The locking threaded hole is provided on the fixing rod 20. An inner wall of the second clamp hole 5 is fixedly provided with serval bumps 12, an outer wall of the fixing rod 20 is provided with clamps slots that correspond to the bumps 12 one by one.

The fitness equipment mounted in the second clamp hole 5 can be a handle 21 or a long rod 22, the handle 21 is fixedly provided with one fixing rod 20, as shown in FIG. 4, the handle 21 is mounted into the second clamp hole 5 through the fixing rod 20, and the dumbbell is mounted into the first clamp hole 4 to form a kettlebell structure. Since the bumps 12 are evenly spaced along a circumferential direction of the second clamp hole 5, the handle 21 can rotate 90-degree relative to the second clamp hole 5 to change different training postures.

Figure 5:
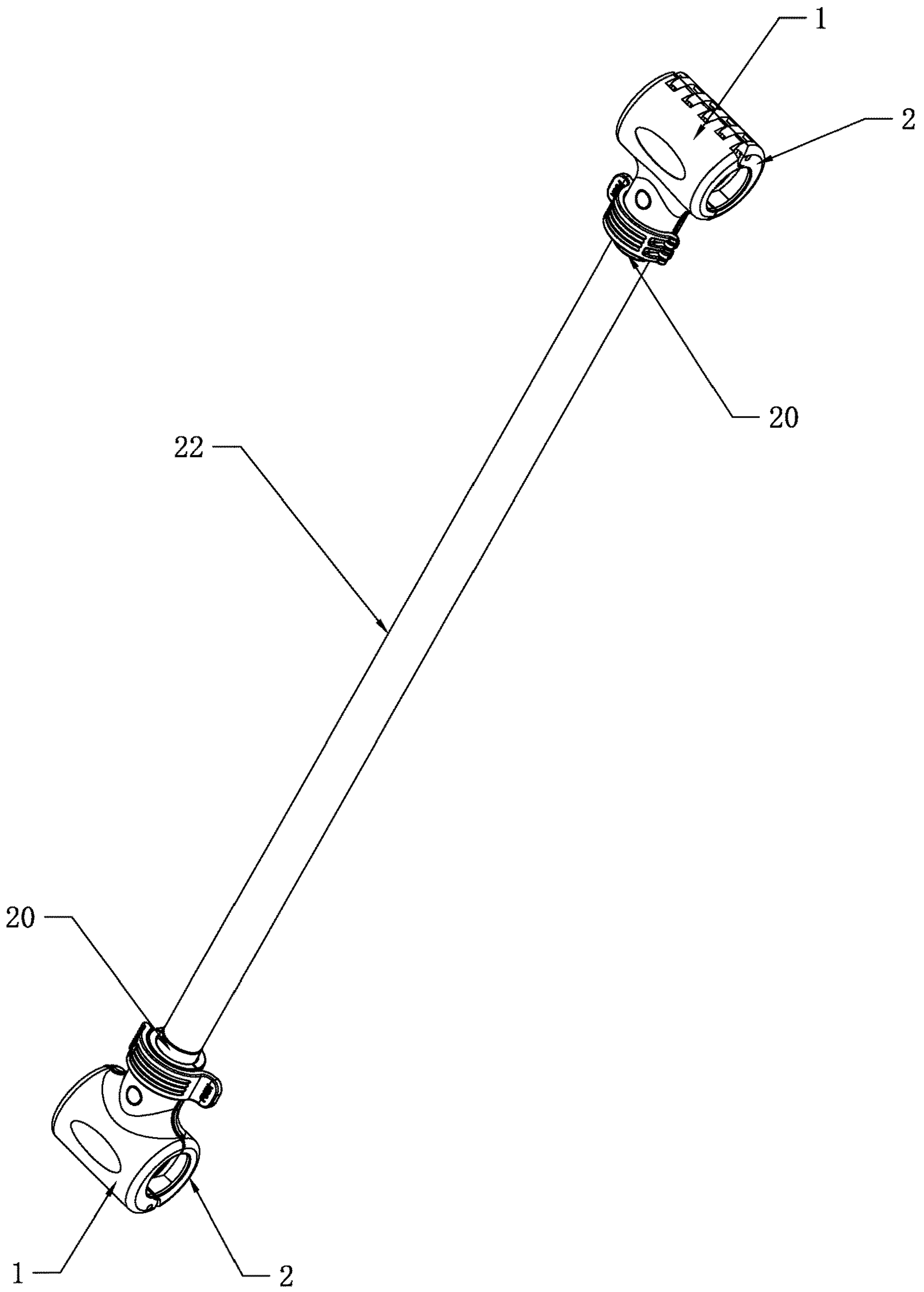
FIG. 5 is a schematic diagram of an installation of two connection members with a long rod of the present disclosure.

As shown in FIG. 5, two ends of the long rod 22 are respectively provided with a fixing rod 20, the two ends of the long rod 22 are respectively mounted into the second clamp hole 5 through the fixing rod 20, and the two dumbbells are respectively mounted into the first clamp holes 4 of the two connectors to form a barbell structure.

Figure 6:
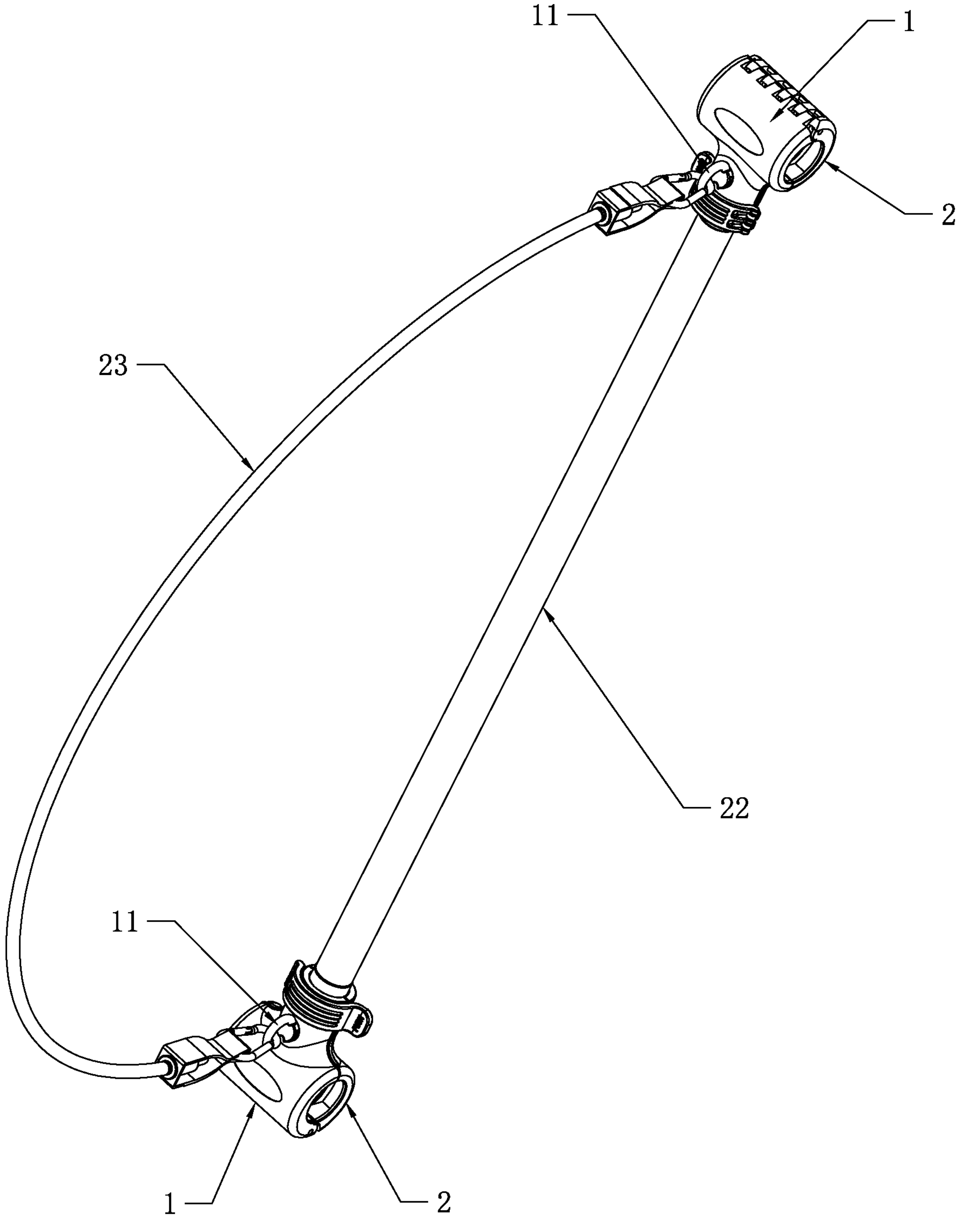
FIG. 6 is a schematic diagram of an installation of two connection members to the long rod and an elastic cord of the present disclosure.

As shown in FIG. 6, two ends of the long rod 22 are provided with a connection member, a spring buckle is fixed on two ends of the elastic cord 23, respectively; and two spring buckles are respectively fastened to the buckle ring 11 of the two connection members. When in use, a tensile resistance can be increased by pulling the long rod 22 by stepping on the elastic cord 23 by foot. The long rod 22 can be provided with one or more elastic cords 23, and can also be replaced with elastic cords with different pounds according to a user's need. There are various ways of use, an installation of the elastic cords 23 and the connectors is convenient and fast, and the connection is more secure.

During an installation, the buckle 6 is opened, the first connection member 1 is flipped upwards, the dumbbell is placed into the first clamp hole 4, the handle or the long rod is placed into the second clamp hole 5, the first connection member 1 is flipped downwards and the buckle 6 is closed, and the buckle ring 11 is fastened through the locking through-hole 3 and the locking threaded hole on the fitness equipment.

It should be understood that in the claims and specifications of the present disclosure, all limitation by "includes . . . " should be understood as an open meaning, which is equivalent to "includes at least . . . " and should not be understood as a closed meaning, that is, its meaning should not be understood as "only includes . . . ".

The specific embodiments described in the description are only illustrative examples of the spirit of the present disclosure. Technicians in the technical field to which the present disclosure belongs may make various modifications or supplements to the specific embodiments described, or use similar methods to replace them, but it will not deviate from the spirit of the present disclosure or go beyond the scope defined in the attached claims.

What is claimed is:

1. A connector of fitness equipment, comprising: a first connection member and a second connection member that are hinged with each other, a clamp cavity configured to connect the fitness equipment is formed by enclosing the first connection member and the second connection member;

wherein a buckling structure configured to lock or unlock the first connection member and the second connection member is provided between the first connection member and the second connection member;

the buckling structure comprises a buckle rotationally provided on the second connection member, a bayonet provided on the second connection member; the buckle is rotated around the first connection member;

wherein an outer end of the buckle is fixedly provided with a buckle plate; the buckle is rotated around the first connection member, and the buckle is pressed so as to render the buckle plate to be elastically deformed and inserted into the bayonet to form a lock;

wherein an outer wall of the first connection member is provided with a buckle ring; the first connection member is provided with a locking through-hole which is interconnected with the clamp cavity, the fitness equipment mounted in the clamp cavity is provided with a locking threaded hole corresponding to the locking through-hole;

an end of the buckle ring is provided with a threaded rod, the buckle ring passes through the locking through-hole and is screwed into the locking threaded hole on the fitness equipment.

2. The connector according to claim 1, wherein the clamp cavity comprises a first clamp hole and a second clamp hole that are perpendicular to each other, the first clamp hole is a through hole running forward and backward along its axis; the locking through-hole is connected to the second clamp hole.

3. The connector according to claim 2, wherein the first connection member is provided with a first groove, the second connection member is provided with a second groove;

when the first connection member is rotated to be locked with the second connection member, the first groove and the second groove are combined up and down to form the first clamp hole;

the first connection member is provided with a third groove, the second connection member is provided with a fourth groove, when the first connection member is rotated to be locked with the second connection member, the third groove and the fourth groove are combined up and down to form the second clamp hole.

4. The connector according to claim 3, wherein the first groove is embedded with a first anti-slip pad, the second groove is embedded with a second anti-slip pad; the first anti-slip pad and the second anti-slip pad are both semicircular in cross-section;

when the first connection member is rotated to be snapped and locked with the second connection member, the first anti-slip pad and the second anti-slip pad are combined to form an anti-slip hole.

5. The connector according to claim 2, wherein a fixing rod is fixedly provided on the fitness equipment installed in the second clamp hole, the fitness equipment is inserted into the first clamp hole through the fixing rod;

the locking threaded hole is provided in the fixing rod;

an inner wall of the second clamp hole is fixedly provided with servals bumps, an outer wall of the fixing rod is provided with clamp slots that corresponding to the bumps one by one.

6. The connector according to claim 1, wherein the second connection member is fixedly provided with a rotation portion that is integrally molded with the second connection member, the buckle is rotationally provided on the rotation portion.

7. The connector according to claim 1, wherein the outer end of the buckle is cocked outwardly to form a pressing portion, the buckle plate is fixedly provided on an inner surface of the pressing portion.

8. The connector according to claim 1, wherein the first connection member is fixedly provided with a contact piece configured to cover a gap between the first connection member and the second connection member when the first connection member is rotated to be snapped and locked with the second connection member.

* * * * *